(12) United States Patent
Kobsa

(10) Patent No.: US 6,229,867 B1
(45) Date of Patent: May 8, 2001

(54) SPRING ACTUATED CABLE CONTROLLED ROD FOR THE CONTROL RODS IN A REACTOR

(75) Inventor: Irvin R. Kobsa, San Jose, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/266,895

(22) Filed: Mar. 12, 1999

(51) Int. Cl.$^7$ .................... G21C 7/08; G21C 7/14
(52) U.S. Cl. ............................ 376/227; 376/233
(58) Field of Search ...................... 376/227–235

(56) References Cited

U.S. PATENT DOCUMENTS

| | | | |
|---|---|---|---|
| 4,076,584 | * | 2/1978 | Golden et al. ................ 176/36 |
| 4,219,384 | * | 8/1980 | Cramer et al. ............... 176/36 C |
| 4,585,608 | * | 4/1986 | Day ................................. 376/245 |
| 4,624,825 | * | 11/1986 | Martin et al. ................. 376/227 |
| 5,200,140 | * | 4/1993 | Kobsa et al. ................. 376/227 |

FOREIGN PATENT DOCUMENTS

| | | | | |
|---|---|---|---|---|
| 54-045483 | * | 4/1979 | (JP) | .................. 376/227 |
| 2-098687 | * | 4/1990 | (JP) | .................. 376/227 |

* cited by examiner

Primary Examiner—Michael J. Carone
Assistant Examiner—Jack Keith
(74) Attorney, Agent, or Firm—Nixon & Vanderhye

(57) ABSTRACT

A spring set within a control rod guide tube in a nuclear reactor biases a control rod for movement into the reactor core. The spring set includes at least three springs in series, two being under compression and one in tension. The control rod may be displaced downwardly in a direction away from the core by a cable connected at one end to the control rod support element and at its opposite end to a drum. By winding the cable on the drum, energy is stored in the spring set. During a SCRAM, the drum is released, enabling the spring set to rapidly displace the control rod fully into the core.

9 Claims, 2 Drawing Sheets

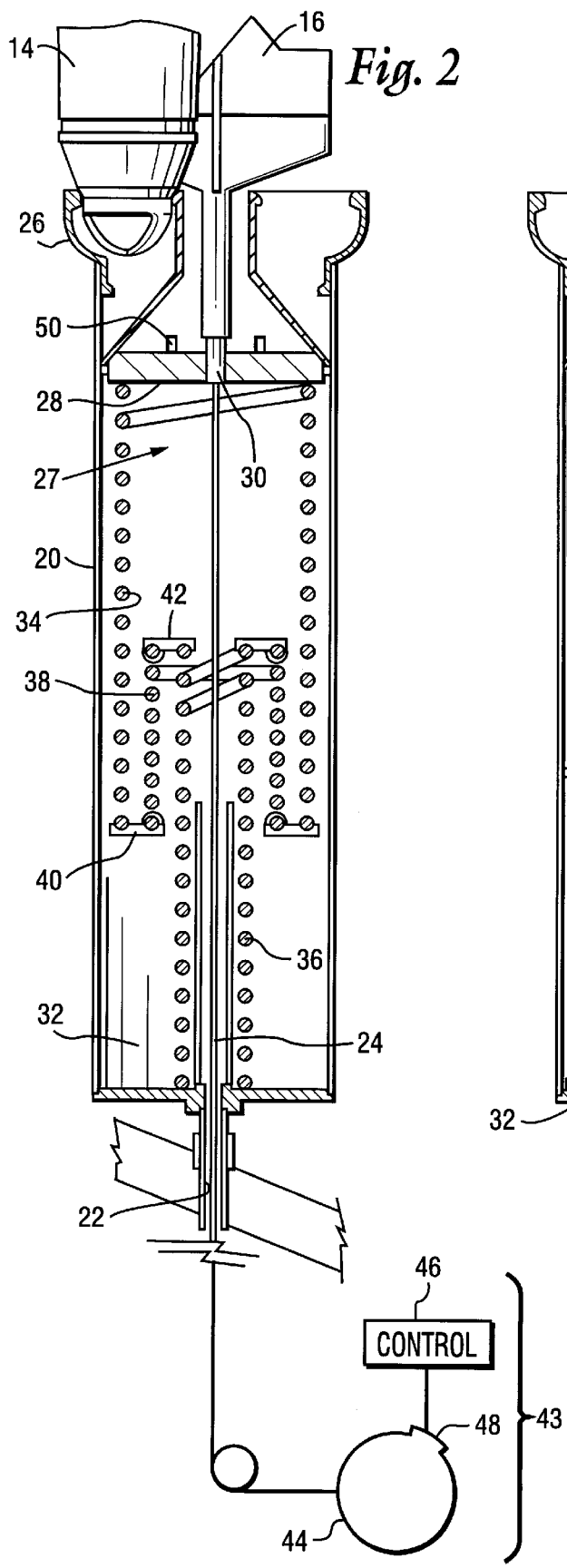
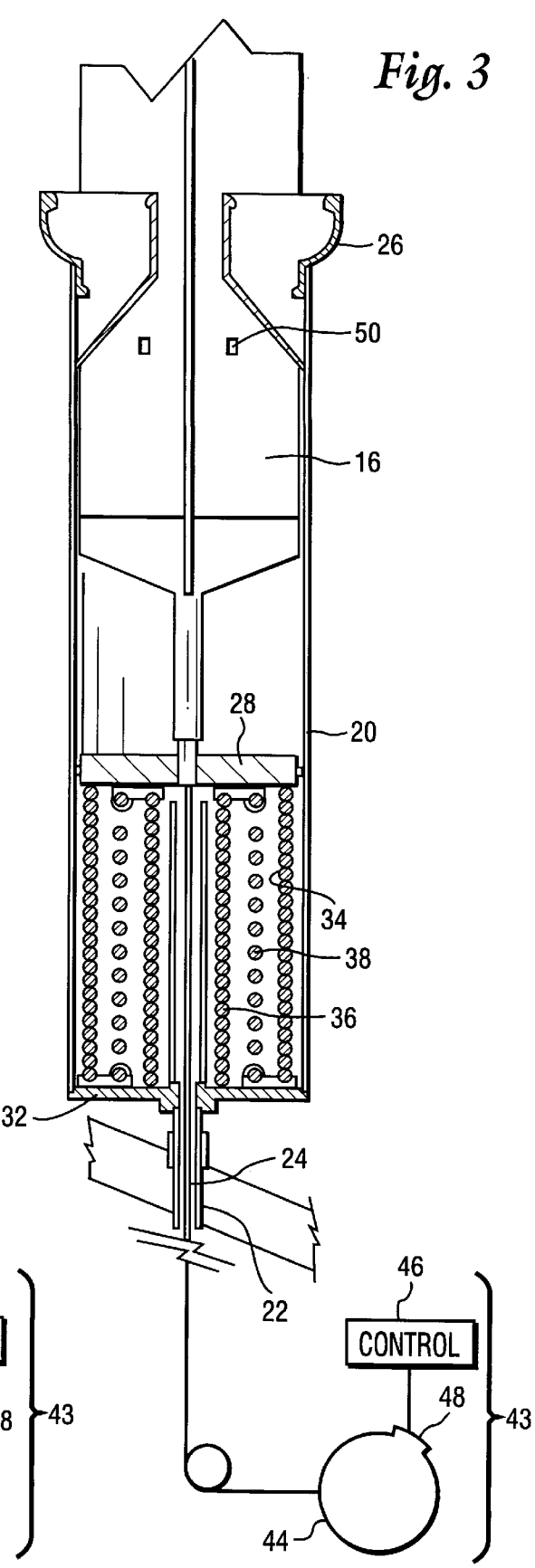

SPRING ACTUATED CABLE CONTROLLED ROD FOR THE CONTROL RODS IN A REACTOR

TECHNICAL FIELD

The present invention relates to a control rod for a nuclear reactor and particularly relates to a control system including a cable-controlled spring assembly for controlling the movement of the control rod into and out of the reactor core.

BACKGROUND OF THE INVENTION

Control rods in a nuclear reactor perform the functions of power distribution, shaping and reactivity control. This is accomplished generally by providing a plurality of control rods containing material for neutron absorption and manipulating the control rods within the reactor core and between the fuel bundle assemblies. Typically, each control rod employed in a boiling water reactor is provided in a cruciform cross-sectional shape and extends in complementary cruciform-shaped interstices between the fuel bundles.

Generally, control rod guide tubes are located inside the pressure vessel and extend from the top of the control rod drive housing through the core support. Typically, each tube is designed as a lateral guide for a control rod and as a vertical support for a four-lobed fuel support piece and the fuel assemblies surrounding the control rod. The bottom of each guide tube is supported by the control rod drive housing which, in turn, transmits the weight of the guide tube, fuel support piece and fuel assemblies to the reactor vessel bottom head. Linear hydraulic systems are employed to drive the control rods. These drive systems, however, involve complicated control systems, as well as space for accumulators, valves, piping and controls.

BRIEF SUMMARY OF THE INVENTION

In accordance with an embodiment of the present invention, there is provided a spring-actuated cable controlled control rod drive system which, among other advantages, eliminates the fluid systems and ancillary equipment necessary for operation of the fluid systems previously employed, as well as saving building space in which such equipment would otherwise reside. Particularly, the present control rod drive system includes a control rod support disposed in the control rod guide tube. The support includes a support element to which the lower end of the control rod is connected and to which is connected a spring set for supplying SCRAM energy. More particularly, the spring set is disposed between the support element and the opposite end of the support guide tube and includes a set of springs, at least two of which springs are series connected lying in compression and a third spring which lies between the series connected springs and lies in tension. Consequently, the weight of the control rod is supported at all times by the springs. Also, the springs at all times bias the support element in a direction to displace the control rod toward the core.

A take-up cable connected at one end to a winch and extending through the control rod guide tube is coupled to the support element. By taking up the cable on the winch, the support element is withdrawn in the guide tube against the bias of the spring set to displace the control rod in a direction away from the reactor core. The spring loading on the spring set at the fully inserted position of the control rod into the core is greater than the weight of the control rod by a predetermined amount. Consequently, as the control rod is withdrawn, energy is stored in the spring set which SCRAMS the control rod upon release of a ratchet on the cable drum. Stops are provided in the guide tube for limiting the travel of the springs. Control rod over-travel is limited by the cable stretching against a limit stop on the drum.

In a preferred embodiment according to the present invention, there is provided an assembly for selectively positioning a control rod along a vertical axis in a nuclear reactor core disposed inside a reactor pressure vessel, comprising a control rod guide tube, a control rod support within the tube for supporting the control rod and movable along the tube, the support including a support element and a spring within the tube biasing the support element for movement in a vertical direction along the axis toward the reactor core, a cable received within the tube and coupled to the support element, a cable control device including a drive for retracting and releasing the cable and a control connected to the drive for selectively retracting the cable and the support element within the tube to move the control rod support element in a direction away from the core against the bias of the spring and releasing the cable enabling the spring to displace the control rod into the core.

In a further preferred embodiment according to the present invention, there is provided a nuclear reactor comprising a pressure vessel, a core containing a plurality of nuclear fuel assemblies and disposed within the pressure vessel, a plurality of control rods mounted for vertical movement within the core, a control rod guide tube for each of the control rods, a control rod support within the guide tube for supporting the control rod and for movement therewith, the control rod support including a support element and a spring within each of the tubes biasing the support element for movement in a vertical direction toward the core, a cable received within each tube and connected to the support, the cable penetrating through the pressure vessel and a cable control device including a drive for each cable outside the pressure vessel for selectively retracting the cable and support element within the tube to move the control rod support element in a direction away from the core against the bias of the spring and releasing the cable enabling the spring to displace the control rod into the core.

BRIEF DESCRIPTION OF THE DRAWINGS

FIG. 2 is a vertical cross-sectional view through a control rod guide tube illustrating the control rod drive assembly of the present invention; and FIG. 3 is a view similar to FIG. 2 with the control rod disposed in a lower position.

DETAILED DESCRIPTION OF THE INVENTION

Figure 1:
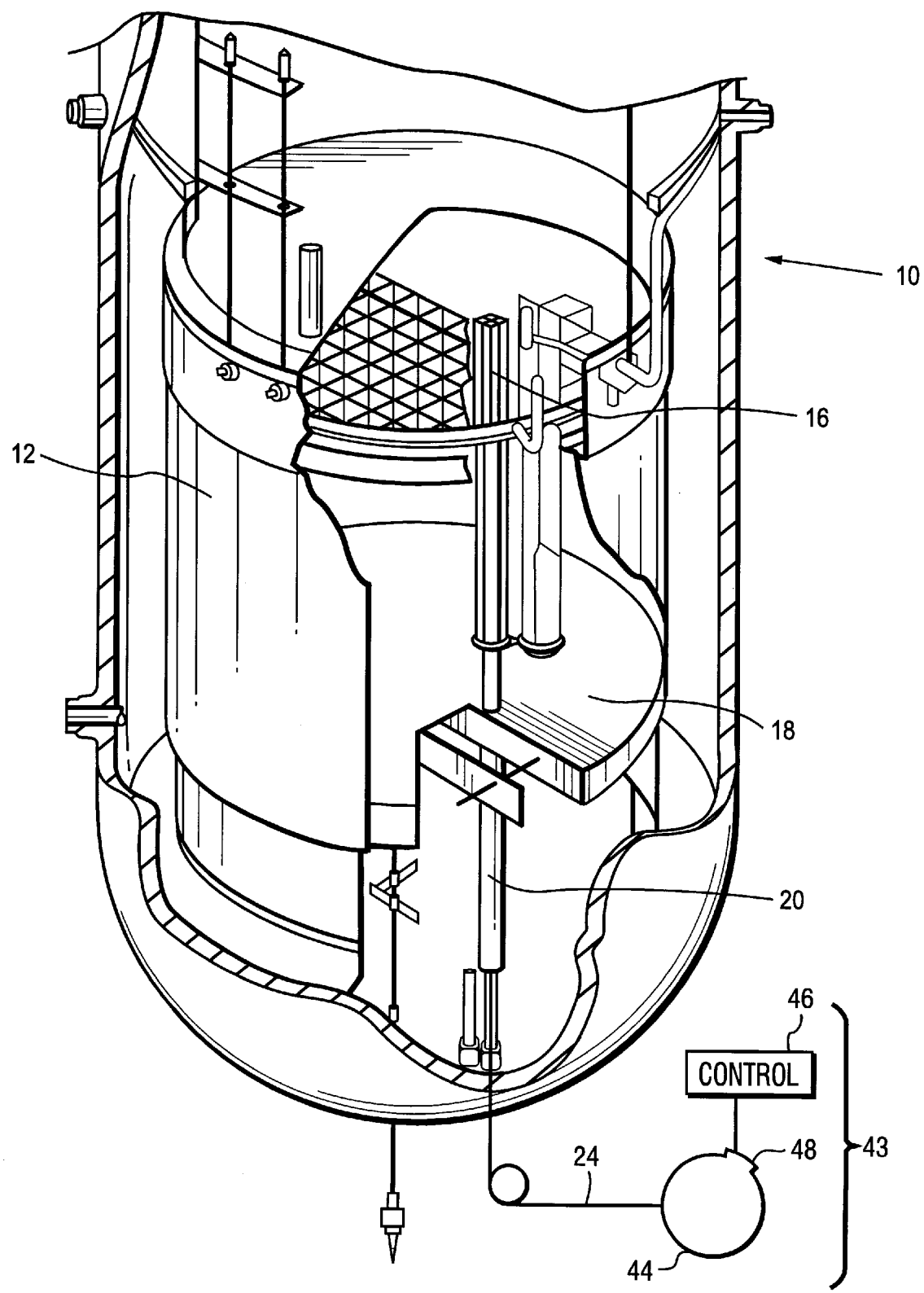
FIG. 1 is a fragmentary perspective view of a boiling water reactor illustrating the reactor core and control rod drive assembly constructed in accordance with the present invention.

Referring now to the drawings, particularly to FIG. 1, there is illustrated a nuclear reactor vessel, generally designated 10, containing a nuclear reactor core 12 having an array of fuel bundles within the core, one such fuel bundle being illustrated at 14 in FIG. 2. The core also includes a plurality of control rods, one such rod being illustrated at 16 in FIGS. 1 and 2. As illustrated in FIG. 2, control rod 16 is generally elongated and cruciform in shape and contains a neutron-absorbing material such as hafnium or boron carbide. As in a typical boiling water nuclear reactor, the control rod 16 is disposed for movement within the interstices of the fuel bundles 14. Also illustrated in FIG. 1 is a core support assembly 18 through which control rod guide tubes 20 penetrate for support of the fuel assemblies 14. The guide tubes 20 are supported by the reactor vessel bottom which has a plurality of penetration openings 22 (FIG. 2) for receiving, in accordance with the present invention cables 24 for, in part, controlling the movement of the control rod in the reactor core.

Referring now to FIG. 2, the upper end of the control rod guide tube 20 has a four-lobed configuration, with each lobe comprising an orificed fuel support 26 for supporting the fuel bundles 14. Thus, it will be appreciated that the control rod 16 lies in the cruciform shape defined between the rectilinear arranged fuel bundles 14 supported by the control rod guide 20.

A control rod support, generally designated 27, lies within the control rod tube 20 for supporting the control rod. The control rod support includes a support element or spring depressor 28 which resides in the guide tube 20 for sliding vertical movement. The support element 28 is coupled through the control rod 16 by a bayonet coupling or by a locking piston coupling spud, indicated at 30. Support 27 also includes a spring set disposed between the support element 28 and the lower end 32 of the guide tubes 20. The spring set includes three springs disposed in series. For example, and in a preferred embodiment of the present invention, the spring set may comprise two helical coil springs 34 and 36 lying in compression with a spring 38 lying in tension disposed between the compression springs 34 and 36. One end of the compression spring 34 engages the underside of the support element 28, while the opposite end engages a first annular force transfer member 40. The intermediate tension spring 38 is connected to the first force transfer member 40 at its lower end and to a second force transfer member 42 at its upper end. The second compression spring 36 engages the underside of the second member 42 at its upper end and at its lower end, engages the bottom 32 of the control rod guide tube 20. The control rod weight is thus supported by the springs throughout the range of movement of the control rod 16. It will be appreciated that movement of the support element 28 in a downward direction, as illustrated in FIG. 3, places the two compression springs 34 and 36 in a higher compressive state and places the tension spring 38 in a state of higher tension. At the full extent of the springs illustrated in FIG. 2, the spring loading, i.e., the bias in an upward direction, is greater than the weight of the control rod and any friction by a substantial amount. As the support element 28 is displaced downwardly, energy is stored in the springs.

To displace the support element 28 in a downward direction, a cable control device 43 is provided and includes a motorized cable drive drum 44 situate external to the pressure vessel and about which drum the cable is wound. Device 43 includes a suitable control 46 connected to the drum 44 which is responsive to control signals to wind the cable 22 on the drum 44 and, hence, lower the support element 28 and following control rod 16 against the bias of the spring set. The device 43 also includes a ratchet 48 whereby the drum may be released, enabling the upward bias of the spring set to drive the support element 28 and, hence, control rod 16 upwardly into the core, for example, during a SCRAM. Suitable stops 50 are disposed within the guide tube 20 to stop the travel of the support element 28. Control rod over-travel is also limited by the cable stretching against a limit stop on the drum.

In operation, the spring set biases the support element 28 and, hence, the control rod 16 for movement in a vertically upward direction into the reactor core. By operating the drum 44, the cable 22 may be wound on the drum to lower the support element 28 and, hence, the control rod 16 to an operating position. It will be appreciated that any lowering of the support element stores energy in the spring set, enhancing the ability of the spring set to rapidly displace the support element and control rod upwardly upon release of the cable by release of the ratchet 48. Consequently, in the event of a SCRAM, the control 46 displaces the ratchet 48 to a position wherein the drum is freewheeling, releasing the cable for upward movement with support element 28 and control rod 16 under the bias of the spring set to drive the control rod 16 fully into the reactor core.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An assembly for selectively positioning a control rod along a vertical axis in a nuclear reactor core disposed inside a reactor pressure vessel, comprising:

a control rod guide tube;

a control rod support within said tube for supporting the control rod and movable along said tube, said support including a support element and a spring within said tube biasing said support element for movement in a vertical direction along said axis toward the reactor core;

a cable received within said tube and coupled to said support element;

a cable control device including a drive for retracting and releasing the cable; and a control connected to said drive for selectively retracting the cable and said support element within the tube to move the control rod support element in a direction away from the core against the bias of said spring and releasing the cable enabling the spring to displace the control rod into the core.

2. An assembly according to claim 1 wherein said spring includes a plurality of discrete coil springs.

3. An assembly according to claim 1 wherein said spring includes a plurality of discrete coil springs connected in series to one another, at least one of said springs lying in tension substantially throughout the range of movement of the control rod.

4. An assembly according to claim 3 wherein at least two of said discrete coil springs lie in compression substantially throughout the range of movement of said control rod, said compression springs being connected in series between said tension spring.

5. An assembly according to claim 1 wherein said control rod guide tube mounts a plurality of fuel assembly supports.

6. A nuclear reactor comprising:

a pressure vessel;

a core containing a plurality of nuclear fuel assemblies and disposed within said pressure vessel;

a plurality of control rods mounted for vertical movement within said core;

a control rod guide tube for each of said control rods;

a control rod support within said guide tube for supporting the control rod and for movement therewith, said control rod support including a support element and a spring within each of said tubes biasing said support element for movement in a vertical direction toward said core;

a cable received within each tube and connected to said support, said cable penetrating through said pressure vessel; and a cable control device including a drive for each said cable outside said pressure vessel for selectively retracting the cable and support element within the tube to move the control rod support element in a direction away from the core against the bias of the spring and releasing the cable enabling the spring to displace the control rod into the core.

7. A reactor according to claim 6 wherein each said spring includes a plurality of discrete coil springs.

8. A reactor according to claim 6 wherein each said spring includes a plurality of discrete coil springs connected in series to one another, at least one of said springs lying in tension substantially throughout the range of movement of the control rod.

9. An assembly according to claim 8 wherein at least two of said discrete coil springs lie in compression substantially throughout the range of movement of said control rod, said compression springs being connected in series between said tension spring.

* * * * *

UNITED STATES PATENT AND TRADEMARK OFFICE
CERTIFICATE OF CORRECTION

PATENT NO. : 6,229,867 B1
DATED : May 8, 2001
INVENTOR(S) : Irvin R. Kobsa

Page 1 of 1

It is certified that error appears in the above-identified patent and that said Letters Patent is hereby corrected as shown below:

Title page,
Item [54], should read -- SPRING ACTUATED CABLE CONTROLLED ROD FOR THE CONTROL RODS IN A NUCLEAR REACTOR --

Signed and Sealed this

First Day of January, 2002

Attest:

JAMES E. ROGAN
*Attesting Officer*    *Director of the United States Patent and Trademark Office*